G. E. STANLEY.
DRIVING MECHANISM.
APPLICATION FILED NOV. 28, 1916.
1,238,950.
Patented Sept. 4, 1917.
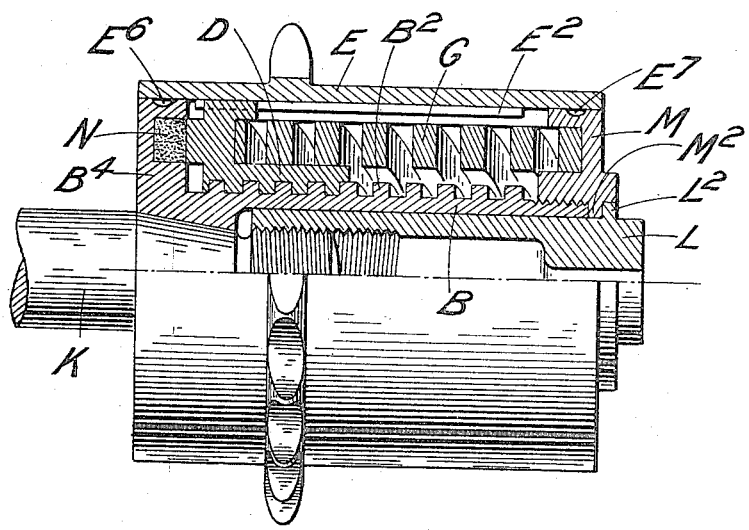
Inventor:
George Enoch Stanley

UNITED STATES PATENT OFFICE.

GEORGE ENOCH STANLEY, OF COVENTRY, ENGLAND.

DRIVING MECHANISM.

1,238,950.      Specification of Letters Patent.      Patented Sept. 4, 1917.

Application filed November 28, 1916. Serial No. 133,877.

*To all whom it may concern:*

Be it known that I, GEORGE ENOCH STANLEY, a subject of the King of Great Britain, and resident of Coventry, Warwickshire, England, have invented certain new and useful Improvements in Driving Mechanism, of which the following is a specification.

This invention relates to driving mechanism, as of motor cycles and the like, and it has for its object to enable a resilient driving connection of the type having a nut acted upon by a spring to be applied directly to the engine shaft or to a countershaft. The features of the invention are that the thrust due to the spring is self-contained, and the device may be constructed so that it can be fitted and removed in an assembled condition.

According to this invention, the collars or the like against which the spring or springs abut are carried on the member on which is formed the screw thread. Thus the thrust is self-contained and is not imparted to the shaft. By forming the screw thread or the like upon a bush, and mounting the collars on this bush, and by enabling the bush to be easily attached and removed the whole device can be fitted and removed in an assembled condition.

The accompanying drawing is a part sectional elevation showing one method of applying this invention.

The shaft K may be assumed to be either the engine crank shaft or a countershaft. In the former case this shaft is the driving and in the latter case it is the driven element. Mounted upon the sleeve E is a chain sprocket, belt pulley, or the like which constitutes the other member. Assuming the construction illustrated to be fitted to a crank shaft, the chain sprocket and the sleeve E constitute the driven member and are resiliently connected with the driving shaft K in the following manner.

Fixed to the shaft K is a bush B the outer surface of which is formed with a coarse thread $B^2$. Upon this travels a nut D the outer periphery of which is formed with teeth or splines which engage corresponding splines $E^2$ on the interior of the sleeve E. This sleeve takes a bearing at $E^6$ upon a collar $B^4$ formed integral with the bush B and at the other end it takes a bearing at $E^7$ upon a collar M which screws upon or is otherwise fixed to the bush. Between this collar M and the nut D is a spring G and between the nut D and the collar $B^4$ may be a buffer such as a resilient washer N let into the collar $B^4$.

The device is secured upon the shaft K by means of a long nut L the flange $L^2$ of which forces the device into position. This flange may also be used to facilitate removal, in which case it is first removed, the collar M unscrewed, the nut L then replaced and the collar M screwed back into place so that the flange $M^2$ lies outside the flange $L^2$. On again unscrewing the nut the bush B will then be drawn off the taper.

The operation will be readily understood. When the shaft K turns, if there is sufficient load, the nut D will screw along the bush B against the spring G until the axial resistance of the latter becomes sufficient to prevent further endwise movement, when the nut D will merely rotate, carrying with it the driven member E. Fluctuation of load causes the nut D to move endwise in the well known manner.

It will be seen that the thrust of the spring is self-contained upon the driving bush B to which the collars $B^4$ and M are attached and upon which the nut D is carried. Further, by screwing the collar M upon the bush B the resilient connection can be assembled and then fitted to the shaft in an assembled condition, and it can be similarly removed.

It will be noticed that the outer member E is not subjected to any side thrust at all. This is an important feature, as owing to the small space available it is not convenient to employ special thrust bearings or the like external to the device, and it is obviously disadvantageous to permit the shaft K to receive any end thrust.

What I claim as my invention, and desire to secure by Letters Patent, is:—

1. In driving mechanism, the combination of a bush, having a thread cut thereon, a nut traveling on said thread, a collar at each end of said bush, a spring between one of said collars and said nut, and a sleeve, the said sleeve and said nut having a splined connection and one of said collars being screwed on said bush to permit the parts to be readily removed, substantially as set forth.

2. In driving mechanism, the combination of a bush, having a thread cut thereon, a nut traveling on said thread, a collar at each end of said bush, a spring between one of said collars and said nut, a sleeve, the said sleeve and said nut having a splined connection, a shaft carrying said bush, and means for attaching said bush to said shaft and removing it therefrom without removing said collars or said sleeve, substantially as set forth.

3. In driving mechanism, the combination of a bush, having a thread cut thereon, a nut traveling on said thread, a collar at each end of said bush, a spring between one of said collars and said nut, a resilient washer in the other collar, a sleeve taking a bearing on said collars, the said sleeve and said nut, having a splined connection substantially as set forth.

In testimony whereof I have signed my name to this specification in the presence of two subscribing witnesses.

GEORGE ENOCH STANLEY.

Witnesses:
ERIC W. WALFORD,
J. FAZAKARLEY.

Copies of this patent may be obtained for five cents each, by addressing the "Commissioner of Patents, Washington, D. C."